(12) United States Patent
Huang (10) Patent No.: US 10,305,785 B2
(45) Date of Patent: May 28, 2019

(54) ADAPTIVE TRAFFIC ROUTING IN COMMUNICATION NETWORKS

(71) Applicant: Xieon Networks S.a.r.l., Senningerberg (LU)

(72) Inventor: Kaiyuan Huang, Kanata (CA)

(73) Assignee: Xieon Networks S.à.r.l., Luxembourg (LU)

(*) Notice: Subject to any disclaimer, the term of this patent is extended or adjusted under 35 U.S.C. 154(b) by 153 days.

(21) Appl. No.: 15/309,133

(22) PCT Filed: Mar. 31, 2015

(86) PCT No.: PCT/EP2015/057098
§ 371 (c)(1),
(2) Date: Nov. 4, 2016

(87) PCT Pub. No.: WO2015/180869
PCT Pub. Date: Dec. 3, 2015

(65) Prior Publication Data
US 2017/0078190 A1 Mar. 16, 2017

(30) Foreign Application Priority Data
May 27, 2014 (EP) .................................... 14170096

(51) Int. Cl.
*H04L 12/26* (2006.01)
*H04L 12/28* (2006.01)
(Continued)

(52) U.S. Cl.
CPC .......... *H04L 45/22* (2013.01); *H04L 43/0852* (2013.01); *H04L 45/121* (2013.01);
(Continued)

(58) Field of Classification Search
CPC ....... H04L 45/22; H04L 45/121; H04L 45/24; H04L 45/70; H04L 45/123; H04L 45/125;
(Continued)

(56) References Cited

U.S. PATENT DOCUMENTS 7,656,796 B1* 2/2010 Ciavattone .............. H04L 47/10
370/230
8,094,550 B2* 1/2012 Winter .................... H04L 69/24
370/229

(Continued)

FOREIGN PATENT DOCUMENTS

WO 98/53577 A1 11/1998

OTHER PUBLICATIONS

International Search Report and Written Opinion, PCT/EP2015/057098, dated May 8, 2015, 11 pages.

*Primary Examiner* — Ruolei Zong
(74) *Attorney, Agent, or Firm* — Nelson Mullins Riley & Scarborough LLP (57) ABSTRACT

At least one data-stream is re-routed and a network element is provided for re-routing at least one data-stream. A first part and a second part of a data-stream received at a first node and are transmitted to a second node via two different network paths, respectively. The first is transmitted from the first node to the second node via a first network path. A second network path is determined, and the difference between latencies of the first and second network paths is also determined. If the latency of the first network path is larger than the latency of the second network path, the at least one data-stream at the first node is re-routed from the first network path to the second network path provided that the time gap between data packets received by the first node exceeds said difference between latencies.

16 Claims, 6 Drawing Sheets

(51) Int. Cl.
  *G06F 15/173*    (2006.01)
  *H04L 12/707*    (2013.01)
  *H04L 12/727*    (2013.01)
  *H04L 12/725*    (2013.01)
  *H04L 12/721*    (2013.01)

(52) U.S. Cl.
  CPC ............ H04L 45/24 (2013.01); H04L 45/302 (2013.01); H04L 45/70 (2013.01)

(58) Field of Classification Search
  CPC ..... H04L 45/302; H04L 45/72; H04L 47/125; H04L 43/0852
  USPC ......................................................... 709/239
  See application file for complete search history.

(56) References Cited

U.S. PATENT DOCUMENTS

| | | | | |
|---|---|---|---|---|
| 8,576,715 | B2* | 11/2013 | Bloch | H04L 45/38 370/235 |
| 9,178,783 | B1* | 11/2015 | Sun | H04L 43/087 |
| 2003/0133443 | A1 | 7/2003 | Klinker et al. | |
| 2003/0231614 | A1 | 12/2003 | Beyda et al. | |
| 2008/0080568 | A1* | 4/2008 | Hughes | H04L 29/06027 370/519 |
| 2009/0016366 | A1* | 1/2009 | Endo | H04L 45/00 370/401 |
| 2009/0303882 | A1* | 12/2009 | Tanaka | H04L 12/4641 370/237 |
| 2014/0064292 | A1* | 3/2014 | Binetti | H04L 41/0668 370/412 |

* cited by examiner

ADAPTIVE TRAFFIC ROUTING IN COMMUNICATION NETWORKS

CROSS REFERENCE TO RELATED APPLICATIONS

This application is a 35 U.S.C. 371 national stage filing of International Application No. PCT/EP2015/057098, filed on Mar. 31, 2015, which claims priority to European Patent Application No. 14170096.3 filed on May 27, 2014. The contents of the aforementioned applications are hereby incorporated by reference in their entireties.

FIELD OF THE INVENTION

The present invention is in the field of routing packet data in data communication networks for network utilization purposes. The present invention relates to a method of re-routing at least one data-stream in a communication network and a network element for re-routing at least one data-stream in a communication network.

BACKGROUND OF THE INVENTION

In a connection oriented packet data network, such as for example a Multiprotocol Label Switching (MPLS) based network, a communication path must be set up between a first node and a second node of the network prior to initiating data transmission between the nodes. Such a communication path may be set up as unidirectional or bidirectional and may be allocated with certain predefined characteristics such as redundancy, bandwidth and latency, depending on the availability of network resources and the requirements made to the data connection. Conventionally, the step of setting up such a communication path may be carried out using various approaches and tools based on different management abstraction levels, such as for example by using
- a network management system,
- a centralized control plane such as software-defined-networking (SDN) or
- by using a distributed signaling protocol such as Resource Reservation Protocol-Traffic Engineering (RSVP-TE).

A request to set up the communication path may come with Quality of Service (QoS) requirements indicating for example minimum bandwidth and/or maximum latency requirements. In order to fulfill such communication path QoS requirements, suitable and sufficient network resources must be allocated along the communication path. For example, a communication path to be set up may require a bandwidth of 1 Gb/s. Consequently, every network element (NE) and every link along the respective network path used to establish the communication path must provide the resources required to satisfy this minimum bandwidth requirement.

Moreover, in packet data based communication networks the actual bandwidth utilization for a communication session can change frequently and dramatically. In other words, bandwidth demand can change significantly, even during a communication session, which dynamically impacts the availability and/or demand of network resources. In order to manage and efficiently utilize the network resources available in the communication network, the network resources must be allocated and reserved to guarantee QoS and to fulfill related traffic engineering conditions.

Figure 1:
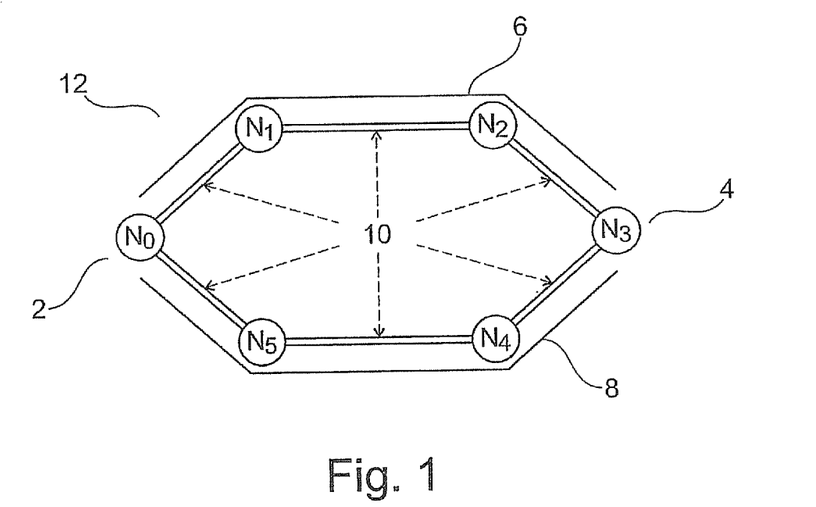
FIG. 1 illustrates a communication network having fragmented used network resources in two network paths.

In this regard, a resource assignment problem can occur when a resource change request for increased bandwidth in a communication path cannot be satisfied because of lack of unused resources or where a request to set up a new communication path between a first and second node cannot be satisfied due to insufficiency of resources. This problem can also occur when there are sufficient resources available in the network, but these are too fragmented to be used. As shown in FIG. 1, each communication link 10 connects nodes $N_i$, of the communication network 12 with maximum bandwidth of 10 Gb/s. In this scenario, there are two existing communication paths 6, 8 connecting a first node 2 ($N_o$) with a second node 4 ($N_3$) via an upper and a lower network path, respectively. For example, each of these two communication paths 6, 8 can be allocated with a bandwidth of 5 Gb/s. If a new request is made to set up an additional communication path for a bandwidth of 8 Gb/s, such a request cannot be satisfied without re-routing the communication path of at least one of the network paths. This applies even though the upper network path and lower network path each could accommodate additional communications of up to 5 Gb/s per route, for a combined additional bandwidth of 10 Gb/s.

Hence, in order to adapt to on-demand communication requests/changes, it may be necessary to re-arrange the current communication arrangement (path routing, resource allocation, etc.). For example, by re-routing the communication path 8 in the lower network path to follow the same route as the communication path 6 in the upper route, the resources available in the lower network path are completely freed up and allow setting up a new communication path requiring a bandwidth up to 10 Gb/s.

Figure 2:
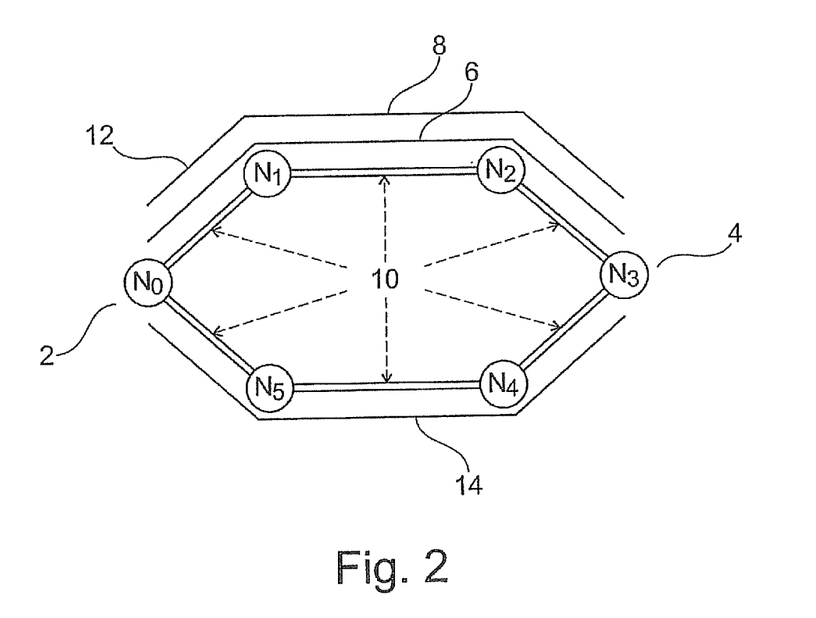
FIG. 2 illustrates a communication network having defragmented used network resources in two network paths.

This is illustrated in FIG. 2, wherein the communication path 8 in the lower network path has been re-routed to follow the same route as the upper communication path 6. Consequently, the bandwidth of 10 Gb/s provided by the upper network path is fully utilized by the two communication paths 6, 8 each requiring a bandwidth of 5 Gb/s.

Further, as illustrated in FIG. 2, 80% of the freed up resources of the lower network path is used to accommodate a new communication path 14 requiring 8 Gb/s. It follows that by efficiently re-routing and so re-arranging the traffic taking place in the communication network, all three communication paths 6, 8, 14 can be served without any lack of service in terms of requested and allocated bandwidth.

However, transitioning the data transmission by re-routing ongoing communication sessions is generally undesirable, because the effects of re-routing communication paths may impact services and deteriorate respective QoS. This is particularly significant when the degree of deterioration violates the fulfillment of Service-Level Agreements (SLAs) which may be adhered to some of the affected communication sessions.

In this regard, a widely used technique to switch between redundancy paths in a communication network for improved availability is known as the Make-before-Break technique. Here, instead of taking down an existing communication path upon a communication path switchover, a new communication path is set up and traffic is routed in parallel to the old existing communication path. Only after establishing the data transmission via the new communication path, the older existing communication path is taken down and the switchover is thus completed without risking loss of connectivity during transition.

In its various forms, the Make-before-Break technique can be used for network resource defragmentation as well as to re-route communication paths and to re-allocate resources.

Figure 3:
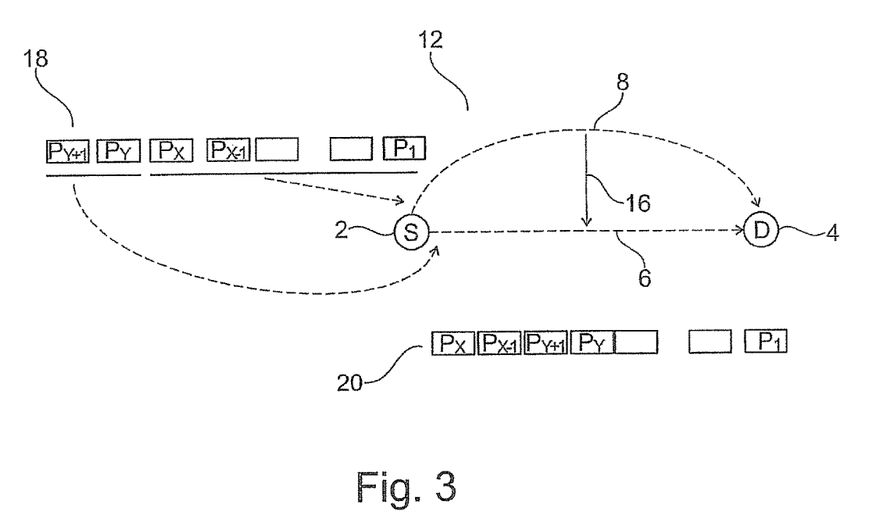
FIG. 3 illustrates distortion of packet ordering at the receiver end due to re-routing a data-stream between network paths having different latencies.

However, although Make-before-Break is conceptually considered hitless, it fails to provide a truly hitless scheme. To understand why this is the case, FIG. 3 illustrates an example of a packet optical network 12 connecting two network nodes 2, 4 representing major cities in a geographically large country such as the United States. Two separate communication paths 6, 8 e.g. connecting a city on the east coast with another city on the west coast can easily have a distance difference of more than thousand kilometers. Even for fiber optical transmission, this distance difference results in a latency difference between the two communication paths 6, 8 amounting to many milliseconds. When the Make-before-Break scheme is used to re-route traffic from the first communication path 6 to the second communication path 8, the following problem can occur: If the traffic is re-routed 16 from a communication path with a longer latency 8 to a communication path with a shorter latency 6, the first packet (and some subsequent packets) following the new path can arrive at the destination while the earlier traffic being conveyed via the original path has not yet fully arrived at the destination node. This is illustrated in FIG. 3 by showing how the sequence 18 of packets $P_1 \ldots P_{Y+1}$ arriving at the first node 2 and forwarded to the second node 4 is reordered by distortion due to re-routing 16 from a communication path 8 with a longer latency to a communication path 6 with a shorter latency. More specifically, the sequence 20 of packets arriving at and leaving the second node 4 has a different order $P_1 \ldots P_Y, P_{Y+1}, P_{X-1}, P_X$ than the sequence 18 transmitted from the first node 1. Here, $P_Y$ and the packets following $P_Y$ transmitted from the first node 2 are re-routed to the communication path with a shorter latency 6, while the earlier packets $P_1 \ldots P_X$ are conveyed via the second communication path 8. Due to the latency difference, packets $P_Y$ and $P_{Y+1}$ arrive earlier at the second node 4 than packets Px and Px+1, even though they were transmitted from the first node 2 at a later time.

Consequently, the receipt of data packets by a destination network element (NE) at the second node 4 is related to the following schemes and problems:

The destination NE may receive the data packets simply by switching from the communication path 8 with a longer latency to the communication path 6 with a shorter latency upon receipt of the first packet Py received via the shorter latency path 6. However, in this case, the traffic still on the fly via the communication path 8 with the longer latency will be lost. For a 10 Gbps path, this may result in many MBs of data being lost. Hence, although this approach is simple to implement, it can easily result in significant data losses.

The destination NE may be adapted to simultaneously receive data packets from both communication paths 6, 8 during the transition of re-routing. Thus, the destination NE may schedule the egress traffic based on arrival time on both ingress ports of the destination NE. However, not only will this approach add to the complexity of the receiver (required to receive and time stamp data packets arriving at two different ports) but it can also result in distorted packet order at the receiver end, negatively impacting QoS.

The destination NE may be adapted to simultaneously receive data packets from both communication paths 6, 8 during the transition of re-routing. Moreover, the destination NE may also attempt to maintain egress traffic to the original packet order at the source. For this purpose, the destination NE must be able to determine the original order of the traffic arriving from the two paths. This means that the NE must inspect additional fields of each data packet containing original time stamp or sequence information, in order to determine the original packet order. If the original data packet structure fails to provide such time stamp or sequence information, this information must be added as control fields into the packets at the first node 2 and then removed after receipt at the second node 4, so to maintain integrity in data structures. As a result, this approach requires significant complexity enhancement to arrive at the desired QoS. In particular, the respective re-ordering of packets at the second node 2 requires the destination NE to buffer in memory the received packets such as to be able to reverse the distorted re-ordering and obtain the original packet order. Consequently, the destination NE is subject to extra memory and related additional costs. Moreover, the process of re-ordering buffered packets at the receiver results in performance penalty, such as for example due to longer processing latency associated with packet buffering.

SUMMARY OF THE INVENTION

Accordingly, a problem underlying the present invention is to provide improved methods and devices to re-route packet data traffic in a communication network. In particular, it is desired to maintain the original packet order at the receiver end without significantly increasing system complexity, processing latency or related costs.

This problem is solved by a method of re-routing at least one data-stream in a communication network according to claim 1 and by a network element for re-routing at least one data-stream in a communication network according to claim 15. Preferable embodiments are defined in the dependent claims.

The method of re-routing at least one data-stream in a communication network according to the present invention comprises the steps of
  receiving at least one data-stream of packets at a first node,
  transmitting a first part of the at least one data-stream from the first node to a second node via a first network path,
  determining a second network path for transmitting a second part of the at least one data-stream from the first node to the second node,
  determining the difference between latencies of the first and second network paths for transmitting data from the first node to the second node, and
  if the latency of the first network path is larger than the latency of the second network path, re-routing the at least one data-stream at the first node from the first network path to the second network path provided that a time gap between consecutive data packets of the at least one data-stream received by the first node exceeds said difference between latencies.

Hence, the present invention provides a method for re-routing at least one data-stream in a communication network. In the present disclosure, the term "data-stream" shall have a broad meaning and generally refer to a series of data packets being transmitted via a communication path. Packet order may need to be maintained within a data stream but packet order do not have to be maintained across different data streams. In this respect, the term "communication path" relates to a data link in the communication network which is used to transmit a data-stream from a first node to a second node of the communication network. Thus, in order to establish a "communication path" in the communication network, the resources of a network path of the communication network must be allocated. Such resources may for example represent network elements (NE) present at network nodes distributed along the respective network path, and may also represent the links connecting the network nodes. The respective links may represent physical data-links between network nodes capable of conveying data-streams with defined transmission characteristics, such as for example with a defined maximum bandwidth or minimum latency. The physical data-links may relate to wired or wireless communication links, and in particular to optical fiber based communication links.

For the purpose of data transmission, the at least one data-stream is received at a first node and is conveyed to a second node of the network. The first and second nodes of the network may represent network elements (NE) of the communication network and may possess technical equipment to process, amplify and transmit at least part of the received data-stream. In an embodiment of the present invention, the at least one data-stream received by the first node of the network is received directly from a data source, such as for example from another network or network element, gateway, data-processing equipment, switch or router. Alternatively, in another embodiment, the at least one data-stream received by the first node of the network may be received via a buffer or delay unit connecting the first node with a data source. In this alternative embodiment of the invention, the buffer or delay unit is adapted to delay the arrival of packets of the at least one data-stream at the first node, see further discussion below.

According to the present invention, a first part and a second part of the received data-stream are transmitted to a second node via two different network paths. For this purpose, a first part of the at least one data-stream is transmitted from the first node to a second node via a first network path. Moreover, a second network path for transmitting a second part of the at least one data-stream from the first node to the second node is determined. Then, the difference between latencies of the first and second network paths is determined. In this regard, the latencies of the first and second network paths relate to the transmission times required for a packet of the at least one data-stream to travel from the first node to the second node via the first and second network paths, respectively.

If the latency of the first network path is larger than the latency of the second network path, the at least one data-stream at the first node is re-routed from the first network path to the second network path provided that a time gap between consecutive data packets of the at least one data-stream received by the first node exceeds said difference between latencies. In other words, if the second network path has a shorter latency than the first network path, and the time gap between consecutive data packets received at the first node exceeds the respective difference of latencies, then the at least one data-stream is re-routed at the first node from the first network path to the second network path. Hence, the re-routing of the at least one data-stream between the network paths takes place if the latency difference between the network paths is accounted for, so that the order of packets received at the second node corresponds to the order of packets transmitted from the first node. Consequently, the at least one data-stream is effectively re-routed from the first network path to the second network path without distorting the order of packets received at the second node. It follows that no further means or data processing is required at the receiver end to resolve any distortion in the order of packets received at the second node.

In a preferred embodiment of the invention, the method further comprises the steps of monitoring the time gap between consecutive data packets of the at least one data-stream received by the first node and triggering said re-routing if the respective monitored time gap exceeds said difference between latencies. In this respect, the packets received by the first node are assumed to arrive sporadically at non-equidistant time-intervals, which is typically the case in asynchronous data packet based communications. Hence, a packet gap detection may be applied at the first node for triggering the re-routing of the at least one data-stream from the first network path to the second network path. More specifically, a packet gap detection may be used at the first node to monitor by determining, measuring or estimating the time gap between consecutive data packets arriving at the first node. If the latency of the first network path is larger than the latency of the second network path, and the packet gap detection detects a respective time gap between consecutive data packets exceeding said difference between latencies, then the at least one data-stream is re-routed at the first node from the first network path to the second network path. In this way, by performing monitoring or gap detection at the first node, the at least one data-stream is effectively re-routed between the first and second network paths without requiring any further means or data processing at the receiver end to resolve any distortion in the order of packets received at the second node.

In an alternative preferred embodiment, the at least one data-stream received by the first node of the network is received via a buffer or delay unit connecting the first node with a data source. In this embodiment of the invention, the buffer or delay unit is adapted to delay the arrival of packets of the at least one data-stream at the first node. Thus, the method according to this embodiment of the invention comprises the additional step of buffering the at least one data-stream to increase the time gap between consecutive data packets of the at least one data-stream received by the first node. In this way, the buffering can be applied to have the time gap between consecutive data packets received at the first node exceed said difference between latencies, so that the re-routing of the at least one data-stream between network paths can be performed in accordance with the present invention. For example, rather than waiting for a sufficient time gap to occur between the respective data packets of a data-stream, the buffering can be applied to force a sufficient time-gap by delaying the data packets being conveyed to this first node. Consequently, the completion of re-routing can be accelerated, in particular when the statistical distribution of the time gaps between consecutive packets results in long waiting times for the randomly occurring sufficient time gap. It should be noted that this packet buffering for desired delay may be temporary and only used during the transition of the re-routing process. The same facility can be subsequently used to assist the rerouting of another data stream as discussed further below.

The buffering may for example be adapted to buffer one or more of the at least one data-stream received by the first node, either simultaneously or sequentially. In this respect, the buffering may be performed for a single or a plurality of data-streams at a time. In case a single data-stream is buffered at a time, a plurality of data-streams may still be buffered by sequentially buffering the plurality of data-streams.

In a preferred embodiment, the method according to the present invention comprises a step of communicating latency information of network paths or latency difference information of network paths, to the first node. This simplifies the above determination of latency differences between network paths and may also be used to determine a suitable second network path for re-routing. Such latency information may for example be collected at different nodes or at a centralized node of the network and conveyed to the first node via a communication link. The communication link may be established in the same communication network subject to re-routing, or may be provided in a different communication system or network which may be based on a different communication technology or infrastructure, for improved robustness, redundancy or flexibility.

Preferably, the re-routing of data-streams in accordance with the present invention is performed to defragmentize resources in the network and thereby free network resources in the first network path. For example, by re-routing a data-stream from the first network path to a second network path, wherein the second network path already accommodates another data-stream or -streams, the network resources are defragmentized to free up network resources in the first network path. As a result, the first network path can for example offer more bandwidth to a new communication path than was possible prior to defragmentation. In this way, the respective defragmentation of network resources may for example be applied to free network resources such that the first network path can satisfy predefined quality of service (QoS) requirements, such as for example bandwidth or latency requirements.

It is also preferred to select the at least one data-stream for re-routing in accordance with the present invention, such as to manage or optimize network resources of the communication network, for example by software-defined networking (SDN).

It is advantageous to select the at least one data-stream for re-routing such as to migrate the data-traffic from an active path to a standby path for improved redundancy at the second node. Hence, the re-routing according to the present invention may be applied to establish communications via a second network path which serves as a standby path. In case of disruption of communication via the first network path, the second network path provides a fallback position for improved redundancy at the second node.

In a preferred embodiment, the method according to the present invention comprises the additional step of dividing data-traffic into said at least one data-stream. In this way, the at least one data-stream subject to re-routing is extracted by division from a larger amount of data-traffic. For example, each of said data-streams of the data-traffic may be allocated to individual users or communication sessions of the communication network. The respective division of data-traffic into said at least one data-stream can be performed in the first node or at a different location. For example, the division of data-traffic may be performed at a different node in the network, wherein the at least one data-stream divided from the data-traffic is subsequently forwarded to the first node for re-routing purposes. In both cases, the at least one data-stream to be re-routed can be selected from a bulk of data-streams bundled in the data-traffic.

In an embodiment, the data-traffic may comprise a plurality of data-streams of a connection session, which are carried over multiple paths in the communication network. In this case, it is further possible to select the at least one data-stream for re-routing such as to migrate the plurality of data-streams of a connection session to a single network path. This can be particularly advantageous, because data-streams of a connection session can be collected in a single network path for improved use of resources, improved transparency of data transmission and to have the transmission of data-streams of a connection session subject to identical or at least similar transmission conditions. Similarly, the at least one data-stream to be re-routed can be selected from a bulk of data-streams collected in data-traffic such as to migrate by re-routing at least one of the data-streams of the connection session to a new network path and thereby improve the network resource utilization.

Alternatively, the at least one data-stream to be re-routed can be selected from a bulk of data-streams collected in data-traffic such as to split the data-traffic over multiple network paths.

In this way, resource utilization, robustness or redundancy of data transmission can be improved, to name a few examples.

The network element for re-routing at least one data-stream in a communication network in accordance with the present invention comprises:
  a receiver, adapted to receive at least one data-stream of packets,
  a transmitter, adapted to transmit a first part of the at least one data-stream from a first node to a second node via a first network path,
  a path determination unit, connected to receive or adapted to determine a second network path for transmitting the at least one data-stream from the first node to the second node
  a latency difference determination unit, connected to receive or adapted to determine the difference between latencies of the first and second network paths for transmitting the at least one data-stream from the first node to the second node, and
  a re-routing engine, adapted to re-route the at least one data-stream from the first network path to the second network path in cases where the latency of the first network path is larger than the latency of the second network path provided that the time gap between consecutive data packets of the at least one data-stream received by the receiver exceeds said difference between latencies.

Thus, the network element according to the present invention is adapted to re-route at least one data-stream in a communication network. In this regard, the network element may for example be a hardware device or a virtual device.

The network element comprises a receiver and a transmitter. The receiver is adapted to receive the at least one data-stream, for example in a first node of the communication network. The transmitter is adapted to transmit a first part of the at least one data-stream from a first node to a second node of the communication network, via a first network path. The network element according to the present invention may possess additional equipment to process and/or amplify signals for transmission of at least part of the received data-stream.

In an embodiment of the network element, the at least one data-stream received by the network element is received directly from a data source, such as for example from another network or network element, gateway, data-processing equipment, switch or router. Alternatively, in another embodiment, the at least one data-stream received by the network element may be received via a buffer or delay unit connecting the network element with a data source. In the latter embodiment of the invention, the buffer or delay unit is adapted to delay the arrival of packets of the at least one data-stream at the network element.

The network element according to the present invention further comprises a path determination unit which is connected to receive or adapted to determine a second network path for transmitting the at least one data-stream from the first node to the second node. Thus, the path determination unit may be connected to receive information defining said second network path from a path determination utility, wherein the path determination utility may be arranged at a different location in the communication network, for example at a different node of the communication network, or in a different communication system or network. Alternatively, the path determination unit may be adapted to process information to determine the second network path for transmitting the at least one data-stream from the first node to the second node.

The network element further comprises a latency difference determination unit which is connected to receive or adapted to determine the difference between latencies of the first and second network paths for transmitting the at least one data-stream from the first node to the second node. Thus, the latency difference determination unit may be connected to receive information defining said latency difference from a latency difference determination utility, wherein the latency difference determination utility may be arranged at a different location in the communication network, for example at a different node of the communication network, or in a different communication system or network. Alternatively, the latency determination unit may be adapted to process information to determine the latency difference between the first and second network paths. As mentioned above, the latencies of the first and second network paths relate to the transmission time required for a packet of the at least one data-stream to travel from the first node to the second node via the first and second network paths, respectively.

The network element according to the present invention further comprises a re-routing engine which is adapted to re-route the at least one data-stream from the first network path to the second network path in cases where the latency of the first network path is larger than the latency of the second network path, and provided that the time gap between consecutive data packets of the at least one data-stream received by the receiver exceeds said difference between latencies. Thus, if the second network path has a shorter latency than the first network path, and the time gap between consecutive data packets received by the receiver exceeds the respective difference of latencies, then the re-routing engine re-routes the at least one data-stream from the first network path to the second network path. Consequently, the at least one data-stream is effectively re-routed from the first network path to the second network path without distorting the order of packets received at the second node. More specifically, according to the present invention, the re-routing of the at least one data-stream between network paths is only conducted if the latency difference between the network paths has been accounted for, so that the order of packets received at the second node corresponds to the order of packets transmitted from the first node. It follows that no further means or data processing is required at the receiver end to resolve any distortion in the order of packets received at the second node.

In a preferred embodiment, the network element comprises a monitoring unit adapted to monitor the time gap between consecutive data packets of the at least one data-stream received by the receiver, and a triggering unit adapted to trigger the re-routing engine to re-route the at least one data-stream from the first network path to the second network path if the monitored time gap exceeds said difference between latencies. In this respect, the packets received by the receiver are assumed to arrive sporadically at non-equidistant time-intervals, which is typically the case in many asynchronous packed based communications. Hence, monitoring and triggering units are applied for triggering the re-routing of the at least one data-stream from the first network path to the second network path. More specifically, the monitoring unit is used to monitor by determining, measuring or estimating the time gap between consecutive data packets of the at least one data-stream received by the receiver. If the latency of the first network path is larger than the latency of the second network path, and the time gap between consecutive data packets of the at least one data-stream received by the receiver exceeds said difference between latencies, the triggering unit triggers the re-routing engine to re-route the at least one data-stream from the first network path to the second network path. In this way, by applying monitoring and triggering unit in accordance with the present invention, the at least one data-stream can be effectively re-routed between the first and second network paths without requiring any further means or data processing at the receiver end to resolve any distortion in the order of packets received at the second node.

Alternatively, the network element may comprise a buffer or delay unit adapted to buffer the at least one data-stream to increase the time gap between consecutive data packets of the at least one data-stream received by the receiver. In this way, the respective time gap between consecutive data packets received by the receiver can be increased to exceed said difference between latencies of network paths. For this purpose, the respective at least one data-stream received by the receiver is received via the buffer or delay unit connecting the receiver with a data source, such as for example another network or network element, gateway, data-processing equipment, switch or router.

In this embodiment, the buffer or delay unit is adapted to increase the time gap between consecutive data packets of the at least one data-stream received by the receiver. Consequently, the buffering can be applied to have the time gap between consecutive data packets received by the receiver exceed said difference between latencies, so that the re-routing engine can reroute the at least one data-stream between network paths in accordance with the present invention. For example, rather than simply waiting for a sufficient time gap to occur, the buffering can be applied to force a sufficient time gap by delaying data packets conveyed to the receiver. Consequently, the completion of re-routing can be accelerated by buffering, in particular when the statistical distribution of time gaps requires so due to otherwise long waiting times for randomly occurring sufficient time-gaps. It should be noted that this packet buffering for desired delay may be temporary and only used during the transition of the re-routing process. The same facility can be subsequently used to assist the re-routing of another data stream.

In this respect, the buffer may be adapted to buffer one or more of the at least one data-stream, either simultaneously or subsequently. More specifically, the respective buffering may be performed for a single or a plurality of data-streams at a time. In case a single data-stream is buffered at a time, a plurality of data-streams may still be buffered in a sequential manner by the buffer.

In a preferred embodiment of the network element, the receiver or the buffer is adapted to receive data-traffic and to divide the data-traffic into said at least one data-stream. In other words, the at least one data-stream subject to re-routing in accordance with the present invention may be extracted by division from a larger amount of data-traffic. For example, each of said data-streams of the data-traffic may be allocated to individual users or communication sessions of the communication network. The advantages of such division of data-traffic into at least one data-stream are discussed above in connection with the method according to the present invention.

Advantageously, the network element according to the present invention further comprises a latency information receiving unit, which is adapted to receive latency information or latency difference information characterizing network paths of the communication network. For this purpose, latency information may be collected at different nodes or at a centralized node of the network and conveyed to the latency information receiving unit via a communication link.

The communication link may be established in the above communication network subject to re-routing, or may be provided in a different communication system which may be based on a different communication technology or infrastructure, for example to improve robustness, redundancy or flexibility.

DESCRIPTION OF THE PREFERRED EMBODIMENTS

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated devices and method and such further applications of the principles of the invention as illustrated therein being contemplated therein as would normally occur now or in the future to one skilled in the art to which the invention relates.

Figure 4:
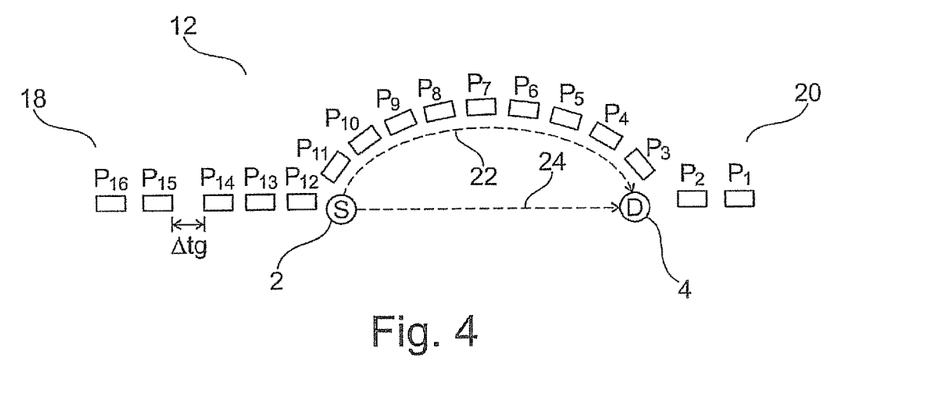
FIG. 4 illustrates the transmission of a data-stream prior to re-routing between network paths in a communication network.
Figure 10:
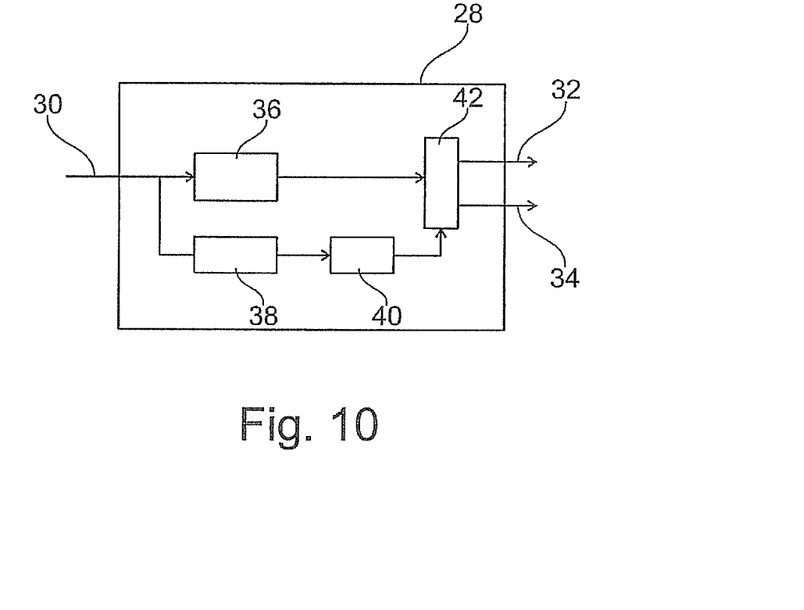
FIG. 10 illustrates an embodiment of an embodiment of a network element according to the present invention.

FIG. 4 is a schematic illustration of the transmission of a data-stream in an optical communication network 12 subject to re-routing a data-stream according to the present invention. In this example, re-routing is performed to free resources in a network path 22 of the communication network 12. Here, a data-stream 18 is received at a first node 2 of the communication network 12. A first part of the received data-stream 18 is transmitted from the first node 2 to a second node 4 via a first network path 22. For example, the first node 2 in FIG. 4 may comprise a network element 28 according to the present invention and as illustrated in FIG. 10. In this case, the data-stream 18 is received by a receiver 36 of the network element and is transmitted by a transmitter of the network element 42 from the first node 2 to the second node 4 via the first network path 32, 22 of the communication network 12.

As mentioned above, re-routing the data-stream transmitted from the first node 2 to a second node via a first network path 22 of the communication network 12 may for example be used to free resources in the first network path 22.

For this purpose, a second network path 24 is determined for transmitting a second part of the data-stream 18. Clearly, the second network path 24 must provide sufficient resources to accommodate the second part of the data-stream 18, which may for example require the fulfillment of bandwidth and latency requirements.

After determining the second network path 24, the difference between latencies of the first and second network paths 22, 24 is determined. As mentioned above, the latencies of the first and second network paths relate to the transmission time required for a packet of the data-stream to travel from the first node 2 to the second node 4 via the first and second network paths 22, 24, respectively. It is assumed in this example that the packet optical network 12 connects two network nodes 2, 4 representing major cities in a geographically large country such as the United States. It follows that the network paths 22, 24 can easily have a distance difference of more than a thousand kilometers. This distance difference results in latency difference $\Delta t_L$ between the two network paths 22, 24 which can easily amount to many milliseconds.

In order to avoid distortion in the order of packets 20 received at the second node 4, the present invention performs re-routing between the first and second network paths 22, 24 if the time gap between consecutive data packets received at the first node 2 exceeds the latency difference $\Delta t_L$, between the two network paths 22, 24. This avoids any distortion in the order of packets at the second node 4, because the time gap is used to compensate the latency difference, wherein the latency of the first network path 22 is larger than the latency of the second network path 24. Otherwise, if the latency of the first network path 22 is smaller than the latency of the second network path 24, an immediate re-routing between network paths would not distort the order of received packets as illustrated in FIG. 3.

In FIG. 4, the time gap between consecutive packets 18 arriving at the first node 2 may vary significantly and it is assumed that the time gap $\Delta t_g$ between consecutive packets $P_{14}$ and $P_{15}$ is the next time gap arriving at the first node 2 which exceeds the latency difference $\Delta t_L$.

Figure 5:
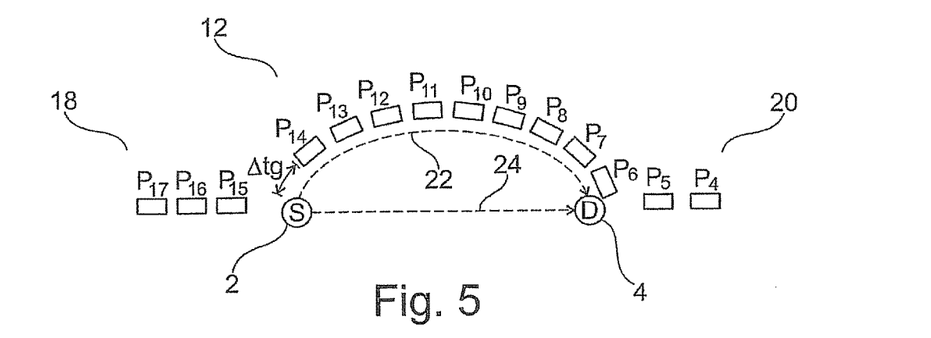
FIG. 5 illustrates the transmission of a data-stream when a sufficient time gap between consecutive packets is detected prior to re-routing between network paths in a communication network.

Thus, as shown in FIG. 5, the re-routing between the first and second network paths 22, 24 is suspended until the time gap $\Delta t_g$ between packets $P_{14}$ and $P_{15}$ is detected to exceed the latency difference $\Delta t_L$.

Figure 6:
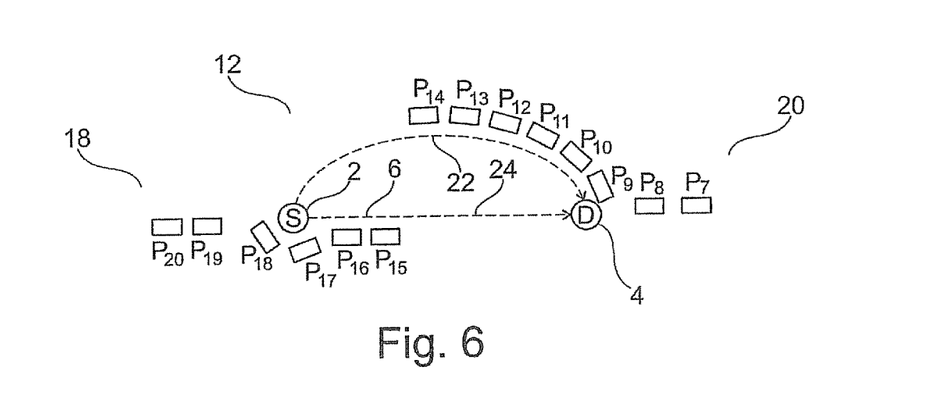
FIG. 6 illustrates the transmission of two parts of a data-stream during the re-routing transition between network paths in a communication network.
Figure 11:
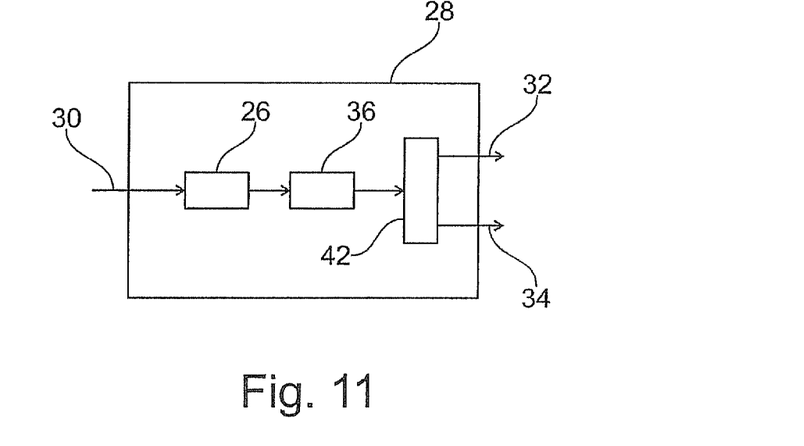
FIG. 11 illustrates an embodiment of a network element according to the present invention comprising a buffer.

For this purpose, with reference to FIGS. 10 and 11, the first node 2 may comprise a network element 28 according to an embodiment of the present invention having monitoring 38 and triggering units 40, wherein the monitoring unit 38 is adapted to monitor the time gap between consecutive data packets of the data-stream received by the receiver 36 of the network element 28. The triggering unit 40 is adapted to trigger a re-routing engine 42 included in the network element 28 if the monitored time gap exceeds the respective latency difference $\Delta t_L$. Thus, triggering takes place when the time gap $\Delta t_g$ between consecutive packets $P_{14}$ and $P_{15}$ is detected to exceed the latency difference $\Delta t_L$. Consequently, the re-routing engine 42 of the network element 28 is triggered to re-route the second part of the data-stream 18 starting with packet $P_{15}$ to the second network path 24. This is illustrated in FIG. 6, wherein the packets of the second part of the data-stream 18 are transmitted via the second network path 24. FIG. 6 further illustrates that during the respective transition of re-routing, packets of the second part of the data-stream 18 are transmitted via the second network path 24 while the transmission of the first part of the data stream 18 comprising packets $P_1$ to $P_{14}$ is being completed via the first network path 22.

Figure 7:
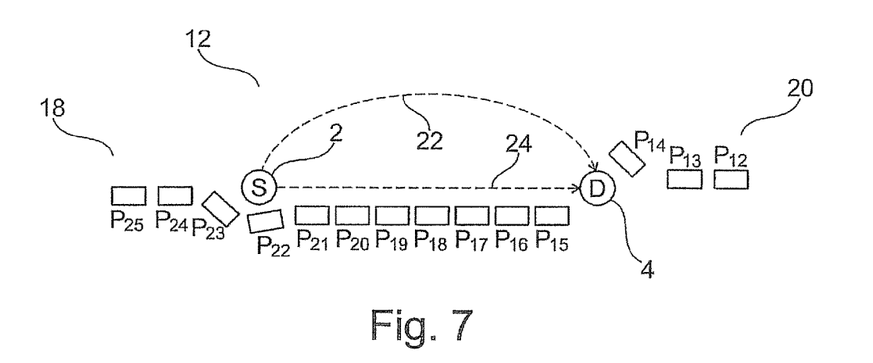
FIG. 7 illustrates the merging of two parts of a data-stream to complete re-routing transition between network paths in a communication network.
Figure 8:
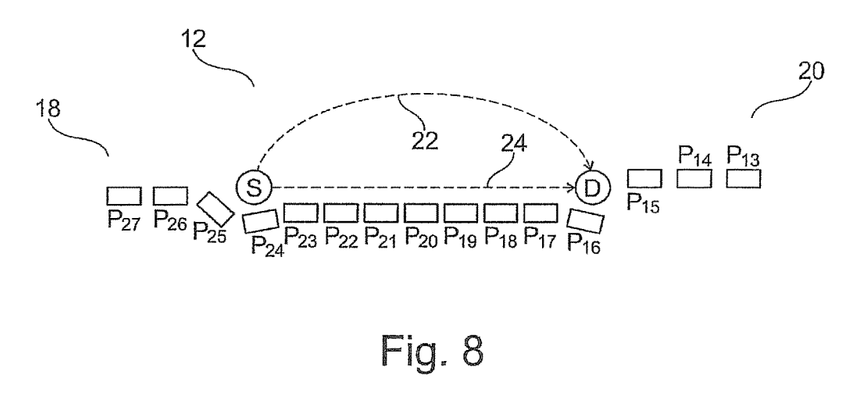
FIG. 8 illustrates the transmission of a data-stream after re-routing between network paths in a communication network.

FIG. 7 shows how upon completion of transmission of the first part of the data stream 18 via the first network path 22, the first packet $P_{15}$ of the second part of the data stream 18 has not yet arrived at the second node 4. Thus, as illustrated in FIG. 8, simply by switching between the receiving data packets from the first and second network paths 22, 24 as soon as the first packet arrives via the second path 24, there is no distortion in the order of packets at the receiver side 4. This is the case because the time gap $\Delta t_g$ between consecutive packets $P_{14}$ and $P_{15}$ at the first node 2 exceeded the latency difference $\Delta t_L$ of the network paths 22, 24 and has been effectively used to compensate for the same. As a result, the time gap between packets $P_{14}$ and $P_{15}$ at the second node 4 has shrunk due to the latency difference, but is still sufficient to separate the packets $P_{14}$ and $P_{15}$ and avoid overlapping or distortion in the order of packets at the receiver side. It follows that no further means or data processing is required at the receiver end to resolve any distortion in the order of packets received at the second node.

It should be noted that for illustration purposes in this example, the latency difference between network paths 22, 24 was selected to amount to approximately the time duration of a single packet. However, other examples of the present invention are based on the same principle as discussed above, and also apply when the latency difference exceeds the time duration of a sequence of packets arriving at the first node 2 as illustrated in FIG. 3.

Figure 9:
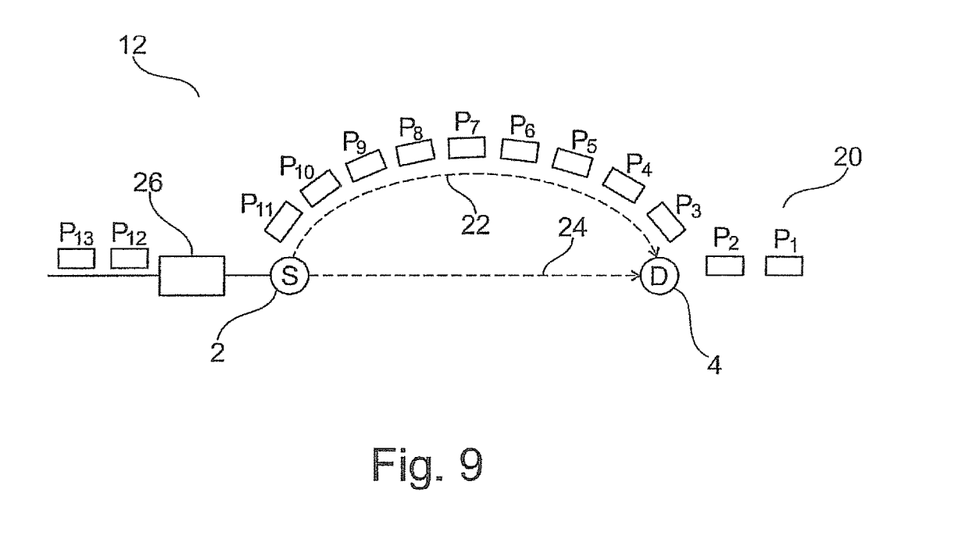
FIG. 9 illustrates an embodiment of the present invention, wherein a buffer is arranged to delay and forward a data-stream to the node of a communication network.

FIG. 9 illustrates a different embodiment of the present invention, wherein a buffer 26 has been arranged to delay and forward the data-stream to the first node 2. The buffer 26 is adapted to buffer the data-stream to increase the time gap between data packets received by the first node 2. In this way, rather than waiting for a suitable time gap to occur between consecutive data packets as shown in FIGS. 4 and 5, the buffer receives the data-stream and creates an effective packet delay so that the occurrence of a time gap between consecutive data packets arriving at the first node 2 exceeds the respective latency difference. Thus, in order to initiate the above re-routing between network paths 22, 24, there is no need to wait for a randomly occurring time gap to exceed the latency difference. In contrast, the buffer is adapted to buffer the data-stream such as to increase the time gap between consecutive data packets until it exceed the latency difference. Hence, by applying the buffer in accordance with the present invention, the above re-routing between network paths 22, 24 can be initiated more quickly and without any delay due to statistical uncertainty.

FIG. 10 is a schematic illustration of a network element 28 according to the present invention. The network element 28 is adapted to receive a data-stream at an input port 30 and to stream the data-stream to at least one of a plurality of output ports 32, 34. In the illustrated embodiment of the invention, the network element comprises a receiver 36 receiving the data-stream arriving at the input port 30. The data-stream received by the receiver 36 is monitored by monitoring unit 38 which is adapted to monitor the time gap between consecutive data packets received by the receiver 36. The network element further comprises triggering unit 40 and a re-routing engine 42, wherein the triggering unit is adapted to trigger the re-routing engine 42 to re-route the received data-stream from one output port to another. Thus, the re-routing engine 42 is adapted to have a transmitter of the network element stream the data-stream by transmission via the first output port 32 until the re-routing engine 42 is triggered by the triggering unit 40 to re-route the received data-stream to the second port 34. In this respect, the triggering unit 40 is adapted to trigger the re-routing engine if the latency of a first network path 22 connected to the first output port 32 is larger than the latency of the second network path 24 connected to the second output port 34 and the monitored time gap between consecutive packets exceeds the difference between latencies. In this way, the network element can be implemented at a first node of a communication network to arrive at the advantages of the present invention discussed above.

FIG. 11 illustrates an alternative embodiment of the network element according to the present invention comprising a buffer 26 which is adapted to buffer the data-stream arriving at the input port 30 to increase the time gap between consecutive data packets arriving at the receiver 36. As discussed above, the buffer is adapted to buffer the data-stream so to increase the time gap between consecutive data packets until it exceed the latency difference. Consequently, by applying the buffer in accordance with the present invention, the above re-routing between network paths 22, 24 can be initiated more quickly by the re-routing engine, without waiting for a random delay to exceed the respective difference between latencies by statistical coincidence.

The embodiments described above and the accompanying figures merely serve to illustrate the method and devices according to the present invention, and should not be taken to indicate any limitation thereof. The scope of the patent is solely determined by the following claims.

LIST OF REFERENCE SIGNS 2 first node
4 second node
6 first communication path
8 second communication path
10 communication link
12 communication network
14 new communication path
16 step of routing traffic
18 sequence of packets arriving at first node
20 sequence of packets leaving second node
22 first network path
24 second network path
26 buffer
28 network element
30 input port
32 first output port
34 second output port
36 receiver 38 monitoring unit
40 triggering unit
42 re-routing engine

The invention claimed is:

1. A method of re-routing at least one data-stream in a communication network comprising the steps of:
   receiving at least one data-stream of packets at a first node,
   transmitting a first part of the at least one data-stream from the first node to a second node via a first network path,
   determining a second network path for transmitting a second part of the at least one data-stream from the first node to the second node,
   determining the difference between latencies of the first and second network paths for transmitting data from the first node to the second node, said latency difference being the result of a difference in the distance of said first and second network paths, and
   if the latency of the first network path is larger than the latency of the second network path, re-routing the at least one data-stream at the first node from the first network path to the second network path provided that a time gap between consecutive data packets of the at least one data-stream received by the first node exceeds said difference between latencies, further comprising the steps of monitoring the time gap between consecutive data packets of the at least one data-stream received by the first node and triggering said re-routing if the monitored time gap between consecutive data packets of the at least one data-stream received by the first node exceeds said difference between latencies.

2. The method of claim 1, further comprising a step of communicating latency information of network paths or latency difference information of network paths to the first node.

3. The method of claim 1, further comprising a step of selecting a data-stream for re-routing to defragment resources in the network and thereby free network resources in the first network path.

4. The method of claim 3, wherein the freed network resources satisfy a predefined quality of service (QoS) requirement.

5. The method of claim 1, further comprising a step of selecting a data-stream for re-routing such as to optimize the network resources of the network.

6. The method of claim 1, further comprising a step of selecting a data-stream for re-routing to migrate the data-traffic from an active path to a standby path for redundancy at the second node.

7. The method of claim 1, further comprising a step of dividing data-traffic into said at least one data-stream.

8. The method of claim 7, wherein the data-traffic comprises a plurality of data-streams (18) of a connection session, which are carried over multiple paths.

9. The method of claim 8, further comprising a step of selecting a data-stream for re-routing to migrate the plurality of data-streams of a connection session to a single network path.

10. The method of claim 8, further comprising a step of selecting a data-stream for re-routing to migrate at least one of the data-streams of the connection session to a new network path and thereby improve the network resource utilization.

11. The method of claim 7, further comprising a step of selecting a data-stream for re-routing to split the data-traffic over multiple network paths.

12. The method of claim 1, wherein each of said data-streams is allocated to individual users of the communication network.

13. A network element for re-routing at least one data-stream in a communication network, comprising:
   a receiver, adapted to receive at least one data-stream of packets,
   a transmitter, adapted to transmit a first part of the at least one data-stream from a first node to a second node via a first network path,
   processing equipment realized as a hardware device or as a virtual device:
      connected to receive or adapted to determine a second network path for transmitting the at least one data-stream from the first node to the second node,
      connected to receive or adapted to determine the difference between latencies of the first and second network paths for transmitting the at least one data-stream from the first node to the second node, said latency difference being the result of a difference in the distance of said first and second network paths
      to re-route the at least one data-stream from the first network path to the second network path in cases where the latency of the first network path is larger than the latency of the second network path provided that a time gap between consecutive data packets of the at least one data-stream received by the receiver exceeds said difference between latencies
      to monitor the time gap between consecutive data packets of the at least one data-stream received by the receiver and
      to trigger the re-routing of the at least one data-stream from the first network path to the second network path if the monitored time gap exceeds said difference between latencies.

14. The network element of claim 13, wherein the receiver is adapted to receive data-traffic and to divide the data-traffic into said at least one data-stream.

15. The network element of claim 13, wherein a buffer is provided in the network element and is adapted to receive data-traffic and to divide the data-traffic into said at least one data-stream.

16. The network element of claim 13, wherein the processing equipment is adapted to receive latency information or latency difference information of network paths of the communication network.

* * * * *